(12) United States Patent
Kirilenko et al.

(10) Patent No.: US 10,563,755 B2
(45) Date of Patent: Feb. 18, 2020

(54) MULTIMEDIA INTERFACE TOUCH SHIFTER

(71) Applicant: ZF Friedrichshafen AG, Friedrichshafen (DE)

(72) Inventors: Alexander Kirilenko, Diepholz (DE); Vitali Fribus, Quakenbrück (DE); Karsten Strassburg, Hannover (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/066,507

(22) PCT Filed: Dec. 8, 2016

(86) PCT No.: PCT/EP2016/080196
§ 371 (c)(1),
(2) Date: Jun. 27, 2018

(87) PCT Pub. No.: WO2017/118512
PCT Pub. Date: Jul. 13, 2017

(65) Prior Publication Data
US 2019/0011041 A1    Jan. 10, 2019

(30) Foreign Application Priority Data
Jan. 5, 2016    (DE) ........................ 10 2016 200 024

(51) Int. Cl.
*G09G 1/00*    (2006.01)
*F16H 59/08*    (2006.01)
(Continued)

(52) U.S. Cl.
CPC ............. *F16H 59/08* (2013.01); *G06F 3/016* (2013.01); *G06F 3/04883* (2013.01);
(Continued)

(58) Field of Classification Search
CPC ... F16H 59/08; G06F 1/00; G06F 3/16; G06F 3/041
See application file for complete search history.

(56) References Cited

U.S. PATENT DOCUMENTS 8,704,790 B2 *   4/2014   Ciesla ..................... G06F 3/044
                                                            345/156
9,310,209 B2 *   4/2016   Yi .......................... G01C 21/206
(Continued)

FOREIGN PATENT DOCUMENTS

DE         103 24 580      * 12/2004      ............. B60R 11/02
DE         103 24 580 A1    12/2004
(Continued)

OTHER PUBLICATIONS

German Office Action dated Oct. 20, 2016, for German Patent Application No. 10 2016 200 024.1 (in German) (7 page).
(Continued)

*Primary Examiner* — Michael A Faragalla
(74) *Attorney, Agent, or Firm* — Brinks Gilson & Lione

(57) ABSTRACT

Operating device for a shift by wire assembly in an automobile comprising a touch sensitive display for selecting selectable operation modes of an automatic and/or automatized transmission of the automobile and having an essentially flat surface, wherein the surface of the touch sensitive display comprises a recess and in that a start position program of the operating device is configured to issue instructions to the touch sensitive display to display a shift pattern when contact with the touch sensitive display is detected at the location of the recess for a predetermined period of time, wherein a start position of the shift pattern is located at the location of the recess.

20 Claims, 2 Drawing Sheets

(51) Int. Cl.
    *G06F 3/0488*     (2013.01)
    *G06F 3/01*     (2006.01)
    *G06F 3/041*     (2006.01)
    *G09G 3/32*     (2016.01)
    *G09G 3/36*     (2006.01)

(52) U.S. Cl.
    CPC ............ *G06F 3/0412* (2013.01); *G09G 3/32* (2013.01); *G09G 3/36* (2013.01); *G09G 2354/00* (2013.01); *G09G 2380/10* (2013.01)

(56) References Cited

U.S. PATENT DOCUMENTS

| | | | |
|---|---|---|---|
| 9,410,613 B2* | 8/2016 | Montes | ................ B60K 35/00 |
| 2010/0231367 A1 | 9/2010 | Cruz-Hernandez et al. | |
| 2012/0041655 A1* | 2/2012 | Thooris | ................ F16H 59/02 |
| | | | 701/52 |

FOREIGN PATENT DOCUMENTS

| | | |
|---|---|---|
| DE | 10 2007 005 889 A1 | 7/2008 |
| DE | 10 2009 031 649 A1 | 1/2011 |
| DE | 10 2011 013 599 A1 | 9/2012 |
| DE | 10 2013 221 895 A1 | 5/2014 |
| DE | 10 2014 008 040 A1 | 12/2015 |
| EP | 2 562 630 A2 | 2/2013 |

OTHER PUBLICATIONS

English translation of page 7 of German Office Action dated Oct. 20, 2016, for German Patent Application No. 10 2016 200 024.1 (2 pages).

International Search Report and Written Opinion of International Search Authority for International PCT Application No. PCT/EP2016/080196, dated Mar. 13, 2017 (in English) (11 pages).

* cited by examiner

MULTIMEDIA INTERFACE TOUCH SHIFTER

RELATED APPLICATIONS

This application claims the benefit under 35 U.S.C. § 371 of the filing date of International Patent Application PCT/EP2016/080196, having an international filing date of Dec. 8, 2016, which claims the benefit of and priority to German Patent Application DE 10 2016 200 024.1, filed on Jan. 5, 2016, both of which are incorporated by reference herein in their entirety.

BACKGROUND

1. Technical Field

The invention relates to an operating device for a shift by wire assembly in an automobile comprising a touch sensitive display for selecting selectable operation modes of an automatic and/or automatized transmission of the automobile and having an essentially flat surface, further comprising a communication interface, one or more processors, memory and one or more programs, wherein the one or more programs are stored in the memory and configured to be executed by the one or more processors, said programs including instructions for detecting contact with the surface of the touch sensitive display and outputting an operation mode selection signal via the communication interface when said contact corresponds to a predefined gesture for selecting one of the said operation modes.

2. Background Information

An operating device of this sort is disclosed in the US Patent Application Publication US2012/0041655A1, wherein it is disclosed that a vector defined by two coordinates resulting from a digital pressure applied by an operator of an automobile is compared to predetermined requirements on the length and orientation of the vector for validating a desired command for selecting an operating mode of the an automobile.

BRIEF SUMMARY

In this context, the object of the invention is to suggest an operating device for changing transmission modes in an automobile that enables simple and error free operation.

The object of the invention is achieved with the subject matter of independent claim 1. The dependent claims describe preferred embodiments of the invention.

The object of the invention, then, is achieved with an operating device for a shift by wire assembly in an automobile comprising a touch sensitive display for selecting selectable operation modes of an automatic and/or automatized transmission of the automobile and having an essentially flat surface, further comprising a communication interface, one or more processors, memory and one or more programs, wherein the one or more programs are stored in the memory and configured to be executed by the one or more processors, said programs including instructions for detecting contact with the surface of the touch sensitive display and outputting an operation mode selection signal via the communication interface when said contact corresponds to a predefined gesture for selecting one of the said operation modes, wherein the surface of the touch sensitive dis-play comprises a recess and wherein a start position program of the operating device is configured to issue instructions to the touch sensitive display to display a shift pattern when contact with the touch sensitive display is detected at the location of the recess for a predetermined period of time, wherein a start position of the shift pattern is located at the location of the recess. The recess provides a start position for enacting touch gestures for selecting operation modes of the automobile and can advantageously be located by the operator solely through touch, i.e. the tactile response of the surface of the display. This permits the operator of the automobile to concentrate on other aspects of controlling the automobile, while freeing the operator from the need to visually inspect the display.

The touch sensitive display could, for example, be an organic light emitting diode display with an integrated touch sensor system, molded together through a process involving film-insert-molded electronics for example. Alternatively, the touch sensitive display can comprise a rear projection polycarbonate film with an integrated and/or attached touch sensor system. The touch sensitive display can also be, for example, a liquid crystal display or thin film transistor display having integrated touch sensors.

The recess can be embodied to have a circular, oval, rectangular or other form, as required to provide the greatest amount of comfort. For example, the recess could be shaped to form fit a finger of the operator.

In an embodiment of the inventive operating device the touch sensitive display comprises a piezo actuator embedded under the surface at the location of the recess, wherein the piezo actuator serves to provide a haptic and/or acoustic feedback to the operator contacting the surface at the location of the recess, when the touch sensitive display displays the shift pattern. The operator can therefore operate the operating device solely by relying on the haptic and/or acoustic feedback signals output by the device.

In an embodiment of the invention the recess is arranged eccentrically on the surface of the touch sensitive display. The operating device can thereby be used to display characters or other sorts of information in the center of the display when the shift pattern is not being displayed, making the touch sensitive display more suitable for use as a multimedia interface. Additionally, for automobiles that traditionally feature multimedia interfaces, installation and material costs can be spared by integrating the functionality of the multimedia interface with the functionality of the operating device for selecting operation modes of the automobile.

In an embodiment of the invention the operating device comprises a selection program, which is configured to issue instructions to detect a movement of the contact on the sur-face of the touch sensitive display corresponding to the predefined gesture, wherein the predefined gesture is defined according to the following rules: a first segment of the movement begins at the recess, comprises a predetermined minimum first distance and a comprises a first direction, wherein the first direction is within a predetermined first angular tolerance with respect to a predetermined direction; a second segment of the movement begins at a location on the surface at which the first segment of the movement ended, comprises a second predetermined minimum distance and comprises a second direction, wherein the second direction is within a second angular tolerance, said second angular tolerance being predetermined such that the an angular difference between the first segment of the movement and the second segment of the movement is less than or equal to ninety degrees.

BRIEF DESCRIPTION OF THE DRAWINGS

Certain embodiments of the invention will next be explained in detail with reference to the following figures. They show.

DETAILED DESCRIPTION OF THE DRAWINGS AND THE PRESENTLY PREFERRED EMBODIMENTS

Figure 1:
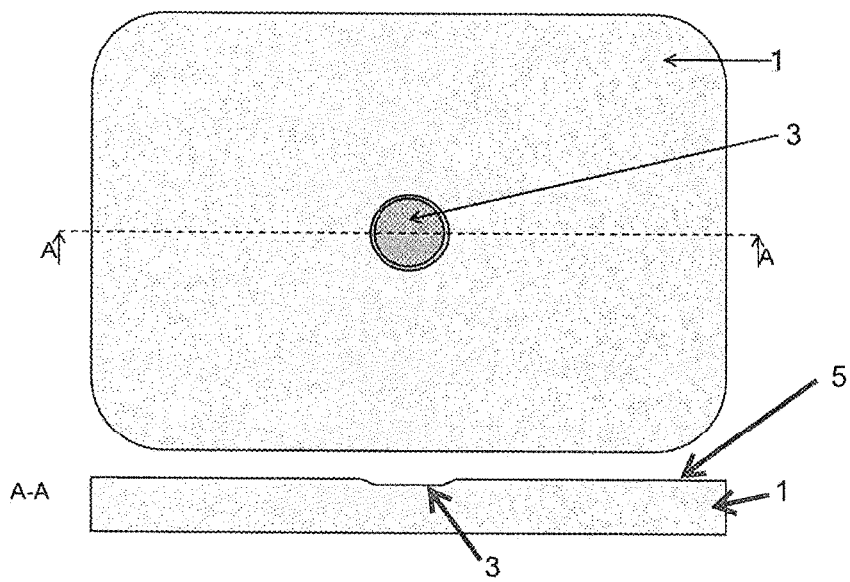
FIG. 1 is a schematic top view and a side sectional view of an embodiment of the invention.

FIG. 1 shows a schematic top view and a side section view of an embodiment of the invention. A touch sensitive display 1 is shown and a circular formed recess 3 in the sur-face 5 of the display 1 is shown in the center of the display 1. In the side sectional view the recess 3 in the surface 3 of the touch sensitive display 1 is depicted, wherein the sides of the recess 3 taper inwards, forming a bowl shaped hollow space in the surface 5 of the display 1. An operator can therefore located the recess 3 without visually inspecting the touch sensitive display 1.

In order to select and operating mode P, R, N, D of the automobile the operator V places a finger in contact with the recess 3 and maintains the contact for a predetermined length of time. When the time requirement has been fulfilled, the operator V receives a haptic feedback from a piezo actuator embedded under the recess 3 and the touch sensitive display 1 displays a shift pattern 9. The operator V can then perform a touch gesture in accordance with the displayed shift pattern 9 and this touch gesture is detected by the touch sensitive display 1, which then outputs a selection signal.

Figure 2:
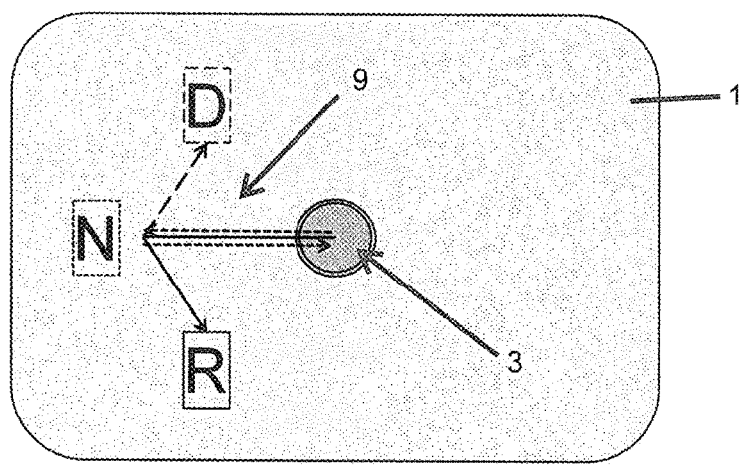
FIG. 2 is a schematic representation of a shift pattern in a top view according to an embodiment of the invention.

FIG. 2 shows a schematic representation of a shift pattern 9 in a top view according to an embodiment of the invention, wherein the start position of the shift pattern 9 corresponds to the location of the recess 3. In order to select the operation modes D or R a touch gesture of the operator must comprise two distinct movements over the surface 5 of the display 1. In a first movement starting at the recess 3 the operator moves a finger in an essentially straight line sideways across the surface 5 of the touch sensitive dis-play 1. I a second movement, the operator V moves the finger in an essentially straight line angled slightly backwards in the direction opposite the first movement such that an acute angle is formed between the direction of the first movement and the direction of the second movement.

Figure 3:
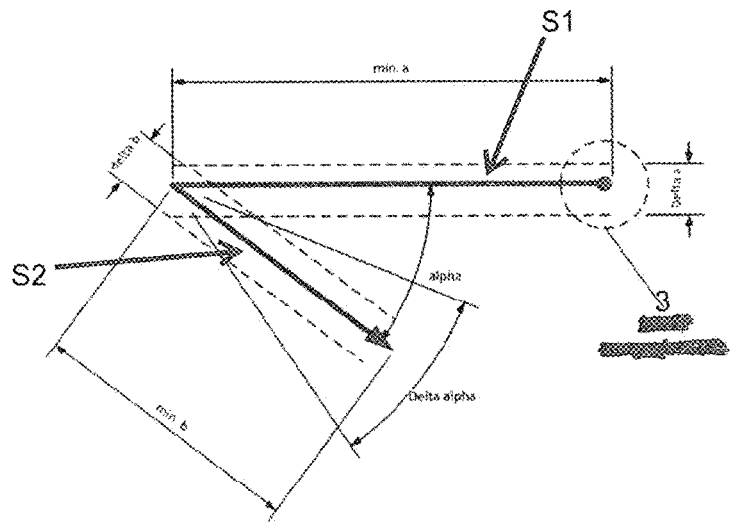
FIG. 3 is a schematic representation of a touch gesture for selection an operation mode of the automobile according to an embodiment of the invention.

FIG. 3 shows a schematic representation of a touch gesture for selection an operation mode R, N, D of the automobile according to an embodiment of the invention. In the schematic diagram the rules as discussed above are visualized. The first rule states that a first segment S1 of the movement begins at the recess, comprises a predetermined minimum first distance min.a and a comprises a first direction, wherein the first direction is within a predetermined first angular tolerance delta.a with respect to a predetermined direction. The second rule states that a second segment S2 of the movement begins at a location on the surface 5 at which the first segment S1 of the movement ended, comprises a second predetermined minimum distance min.b and comprises a second direction, wherein the second direction is within a second angular tolerance delta.b, said second angular tolerance delta.b being predetermined such that the an angular difference a between the first segment S1 of the movement and the second segment S2 of the movement is less than or equal to ninety degrees. In FIG. 3 the angular difference a is even less than 90 degrees and an acute angle is formed.

Figure 4:
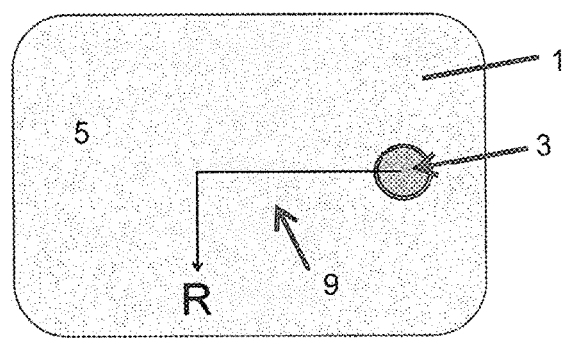
FIG. 4 is a schematic top view of an alternative embodiment of the invention.

FIG. 4 shows a schematic top view of an alternative embodiment of the invention. In FIG. 4 the recess is eccentrically arranged on the surface 5 of the touch sensitive display 1. A touch gesture of the operator V for selecting the reverse operation mode R is depict-ed. Arranging the recess 3 off-center has the benefit that the display 1 can be employed as a multimedia interface MIMI, which reduces the cost of producing automobiles since the number of electronic components needed for two devices is reduced to the number needed for one device.

REFERENCE CHARACTERS 1 touch sensitive display
3 recess
5 surface of the display
9 shift pattern
S1 first segment of the movement
S2 second segment of the movement
min.a minimum first distance
min.b minimum second distance
delta.a max first angular deviation
delta.b max second angular deviation
α angular difference between first and second segments
P park operation mode
R reverse operation mode
N neutral operation mode
D drive operation mode

What is claimed is:

1. An operating device for a shift by wire assembly in an automobile, the operating device comprising:

a touch sensitive display for selecting a plurality of selectable operation modes of an automatic and/or automatized transmission of the automobile and comprising an essentially flat surface;

wherein the touch sensitive display further comprises a communication interface, one or more processors, memory and one or more programs;

wherein the one or more programs are stored in the memory and configured to be executed by the one or more processors, the one or more programs comprising instructions for detecting contact with the surface of the touch sensitive display and outputting an operation mode selection signal via the communication interface when the contact corresponds to a predefined gesture for selecting one of the plurality of operation modes;

wherein the surface of the touch sensitive display comprises a recess and in that a start position program of the operating device is configured to issue instructions to the touch sensitive display to display a shift pattern when contact with the touch sensitive display is detected at a location of the recess for a predetermined period of time; and wherein a start position of the displayed shift pattern is located at the location of the recess and wherein the displayed shift pattern includes at least a first segment of the shift pattern displayed as originating at the location of the recess.

2. The operating device of claim 1, wherein the touch sensitive display comprises a piezo actuator embedded under the surface at the location of the recess; and
   wherein the piezo actuator serves to provide a haptic and/or acoustic feedback to the operator contacting the surface at the location of the recess when the touch sensitive display displays the shift pattern.

3. The operating device of claim 1, wherein the recess is arranged eccentrically on the surface of the touch sensitive display.

4. The operating device of claim 1, wherein the operating device also comprises a selection program, which is configured to issue instructions to detect a movement of the contact on the surface of the touch sensitive display corresponding to a predefined gesture, wherein the predefined gesture is defined according to the following rules:
   a first segment of the movement begins at the recess and comprises a predetermined minimum first distance and a first direction, wherein the first direction is within a predetermined first angular tolerance with respect to a predetermined direction; and
   a second segment of the movement begins at a location on the surface at which the first segment of the movement ended and comprises a second predetermined minimum distance and a second direction, wherein the second direction is within a second angular tolerance, the second angular tolerance being predetermined such that the an angular difference between the first segment of the movement and the second segment of the movement is less than or equal to ninety degrees.

5. The operating device of claim 2, wherein the recess is arranged eccentrically on the surface of the touch sensitive display.

6. The operating device of claim 1, wherein the operating device also comprises a selection program, which is configured to issue instructions to detect a movement of the contact on the surface of the touch sensitive display corresponding to a predefined gesture.

7. The operating device of claim 6, wherein the predefined gesture comprises:
   a first segment of the movement that begins at the recess and comprises a predetermined minimum first distance and a first direction, wherein the first direction is within a predetermined first angular tolerance with respect to a predetermined direction.

8. The operating device of claim 7, wherein the predefined gesture further comprises:
   a second segment of the movement that begins at a location on the surface at which the first segment of the movement ended.

9. The operating device of claim 8, wherein
   the second segment of the movement comprises a second predetermined minimum distance and a second direction, wherein the second direction is within a second angular tolerance.

10. The operating device of claim 1, wherein the touch sensitive display further comprises a light emitting diode display having an integrated touch sensor system.

11. The operating device of claim 1, wherein the touch sensitive display further comprises a rear projection polycarbonate film having an integrated and/or attached touch sensor system.

12. The operating device of claim 2, wherein the touch sensitive display further comprises a rear projection polycarbonate film having an integrated and/or attached touch sensor system.

13. The operating device of claim 1, wherein the touch sensitive display further comprises a liquid crystal display or thin film transistor display having integrated touch sensors.

14. The operating device of claim 2, wherein the touch sensitive display further comprises a liquid crystal display or thin film transistor display having integrated touch sensors.

15. The operating device of claim 1, wherein the recess has a circular, oval or rectangular shape.

16. The operating device of claim 2, wherein the recess has a circular, oval or rectangular shape.

17. The operating device of claim 1, wherein sides of the recess taper inwards to form a bowl shaped hollow space in the surface of the touch sensitive display.

18. The operating device of claim 2, wherein sides of the recess taper inwards to form a bowl shaped hollow space in the surface of the touch sensitive display.

19. The operating device of claim 1, wherein touch sensitive display comprises a multimedia interface.

20. The operating device of claim 2, wherein touch sensitive display comprises a multimedia interface.

* * * * *